May 11, 1926.
J. A. HEALY ET AL
POULTRY DRINKING FOUNTAIN
Filed Oct. 9, 1922
1,584,536
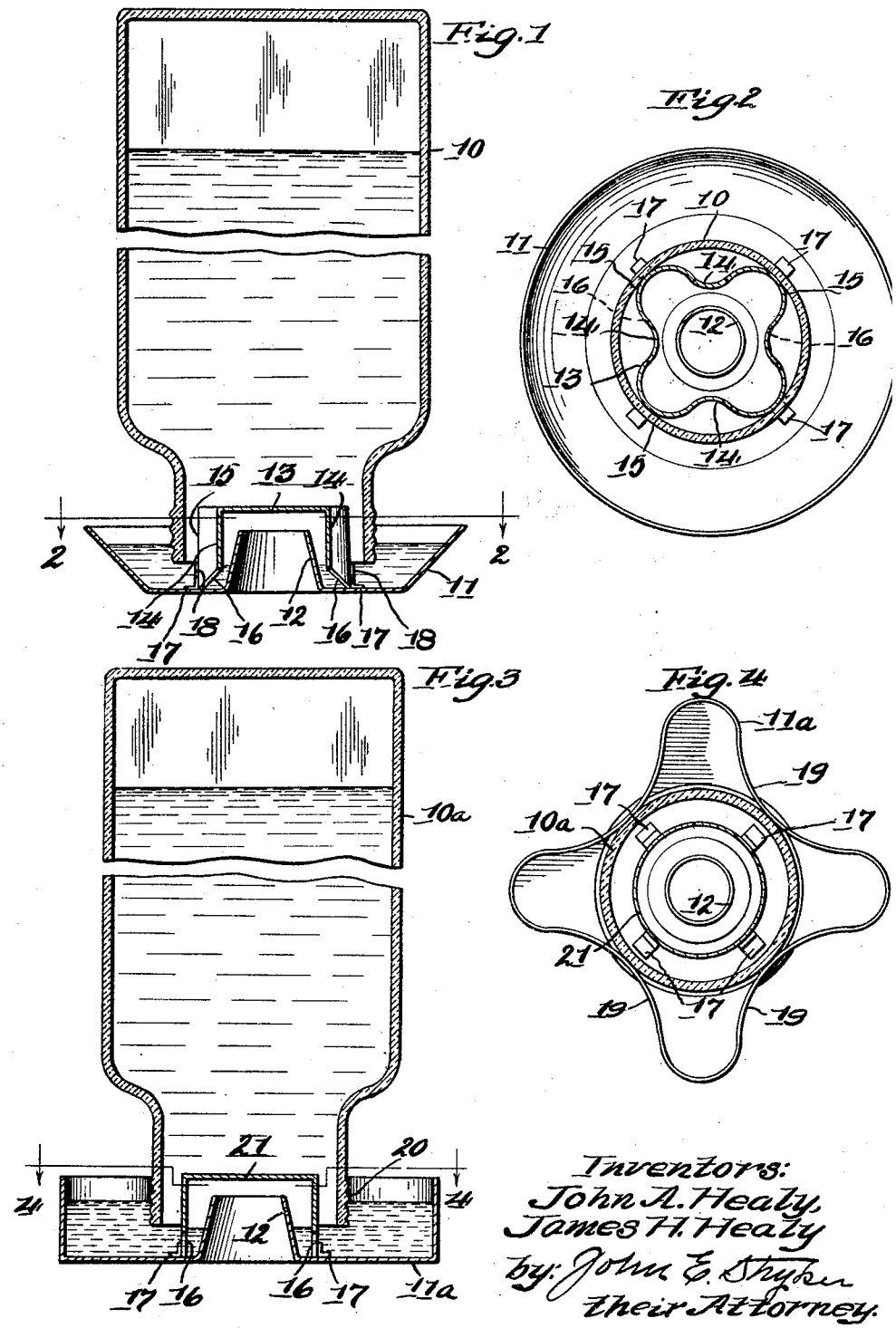
Inventors:
John A. Healy,
James H. Healy
by: John E. Stryker
Their Attorney.

Patented May 11, 1926.

1,584,536

UNITED STATES PATENT OFFICE.

JOHN A. HEALY, OF LANGDON, AND JAMES H. HEALY, OF ST. PAUL, MINNESOTA.

POULTRY DRINKING FOUNTAIN.

Application filed October 9, 1922. Serial No. 593,199.

It is our object to facilitate the care of poultry by providing a novel, simple and efficient drinking fountain which may be filled without separating the reservoir from the trough.

A further object of our invention is to provide a drinking trough which may be filled through an aperture in the bottom thereof after merely inverting the same.

Another object of our invention is to provide in a device of this kind a filling passageway which is independent of the discharge opening and provided with a trap or seal to prevent the escape of water while the device is in use.

Other objects of our invention will appear and be more fully pointed out in the following specification and claims.

In the accompanying drawings Figure 1 is a central vertical section of our improved fountain; Fig. 2 is a section taken on the line 2—2 of Fig. 1; Fig. 3 is a central vertical section of an alternate form of trough and Fig. 4 is a section taken on the line 4—4 of Fig. 3.

Our device in its preferred embodiment consists of a reservoir 10 which is adapted to be secured at its lower end to a trough 11. A filling neck 12 is formed in the center of the trough 11 to project into the base of the reservoir. This neck is open at its upper and lower ends and a trap or water seal is formed over the upper end of said neck 12 by a cap 13. The cap 13, as clearly shown in Fig. 2, is formed with concave surfaces 14 and convex surfaces 15. The concave surfaces 14 of the cap 13 are notched at 16 adjacent to the trough 11 to permit water to flow from the cap 13 into the reservoir 10 as hereinafter described. The cap 13 is secured to tabs 17 which are in turn secured to the trough 11.

To fasten the reservoir 10 to the trough 11 the convex surfaces 15 are formed to converge or taper upwardly so that they are adapted to engage the inner periphery of the open lower end of the reservoir 10. Downward movement of the reservoir on the surfaces 15 is limited by lugs 18 formed integral with the tabs 17. The reservoir 10 is maintained in secure engagement with the surfaces 15 except when it is desired to clean the fountain.

To fill the reservoir 10 it is first inverted and then water is poured into the neck 12 in the bottom of the trough 11. The water, after filling the cap 13, flows out through the notches 16 into the reservoir 10. When the reservoir has been filled it is returned to its normal position so that it rests upon the base of the trough 11.

Escape of water from the reservoir is prevented by air pressure on the surface of the water in the trough 11 and also on the surface of the water in the cap 13. The upper extremities of the notches 16 are beneath the upper end of the neck 12 so that air is excluded from the reservoir 10 by the water which rises to the top of said notches. The supply of water in the trough 11 is replenished in the usual manner as soon as the level in the trough is reduced to the bottom of the reservoir.

In the alternate form of our device, shown in Figs. 3 and 4, the operation is identical with that described above, but the means for securing the reservoir to the trough are different. In the alternate form the trough 11$^a$ is formed with concave portions 19 which engage the outer periphery of the reservoir 10$^a$. The reservoir 10$^a$ is preferably formed with a threaded neck 20 which is adapted to engage suitable threads formed on the concave portions 19 of the trough 11$^a$. The cap 21 in the alternate form is cylindrical in shape but otherwise like the cap 13 of the preferred embodiment.

It is obvious that our device might be enlarged and its principles of construction be embodied in a drinking fountain for stock other than poultry without departing from the spirit of our invention.

Having described our invention what we claim as new and desire to protect by Letters Patent is:

1. In a device of the class described a drinking trough, a reservoir adapted to be secured to said trough, an upwardly projecting filling neck in the bottom of said trough, and a stationary cap rigidly mounted over said neck and formed with apertures adjacent to said trough, said neck and cap being arranged to normally form a seal to prevent the escape of water from said trough.

2. In a device of the class described a drinking trough, a reservoir adapted to be secured to said trough, an upwardly projecting filling neck in the bottom of said trough, a cap rigidly mounted over said neck and formed with apertures adjacent to said trough, said neck and cap being spaced apart to normally form a water seal to prevent the escape of water from said trough, and a passageway independent of said filling neck for discharging water from said reservoir into said trough.

3. In a device of the class described a reservoir, a trough secured to the bottom of said reservoir and adapted to be inverted for filling, filling and discharge passageways for the flow of water respectively into and out of said reservoir, both of said passage ways being continuously open and water seals for said passageways.

In testimony whereof, we have hereunto signed our names to this specification.

JOHN A. HEALY.
JAMES H. HEALY.